Patented Feb. 16, 1954

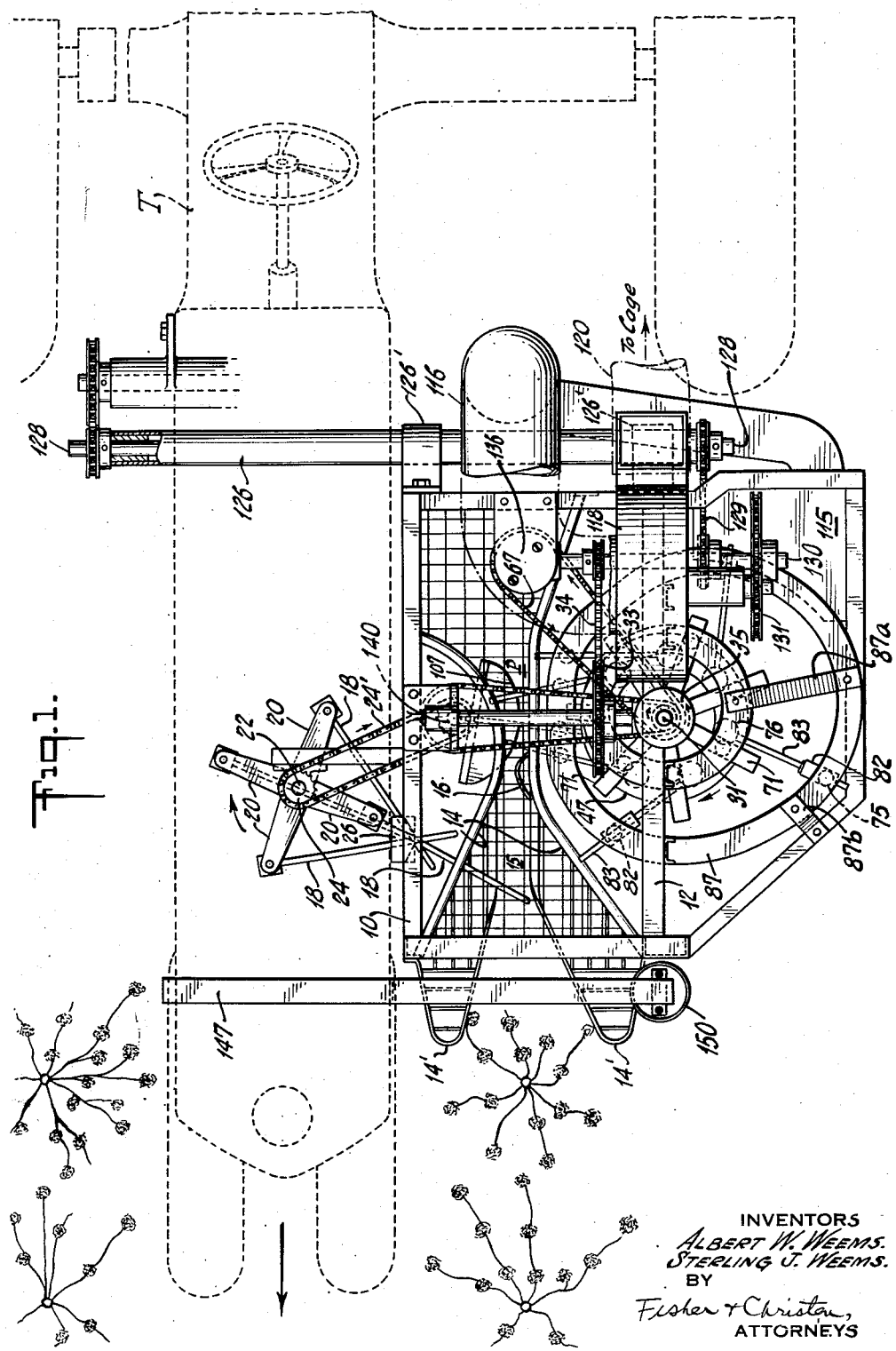

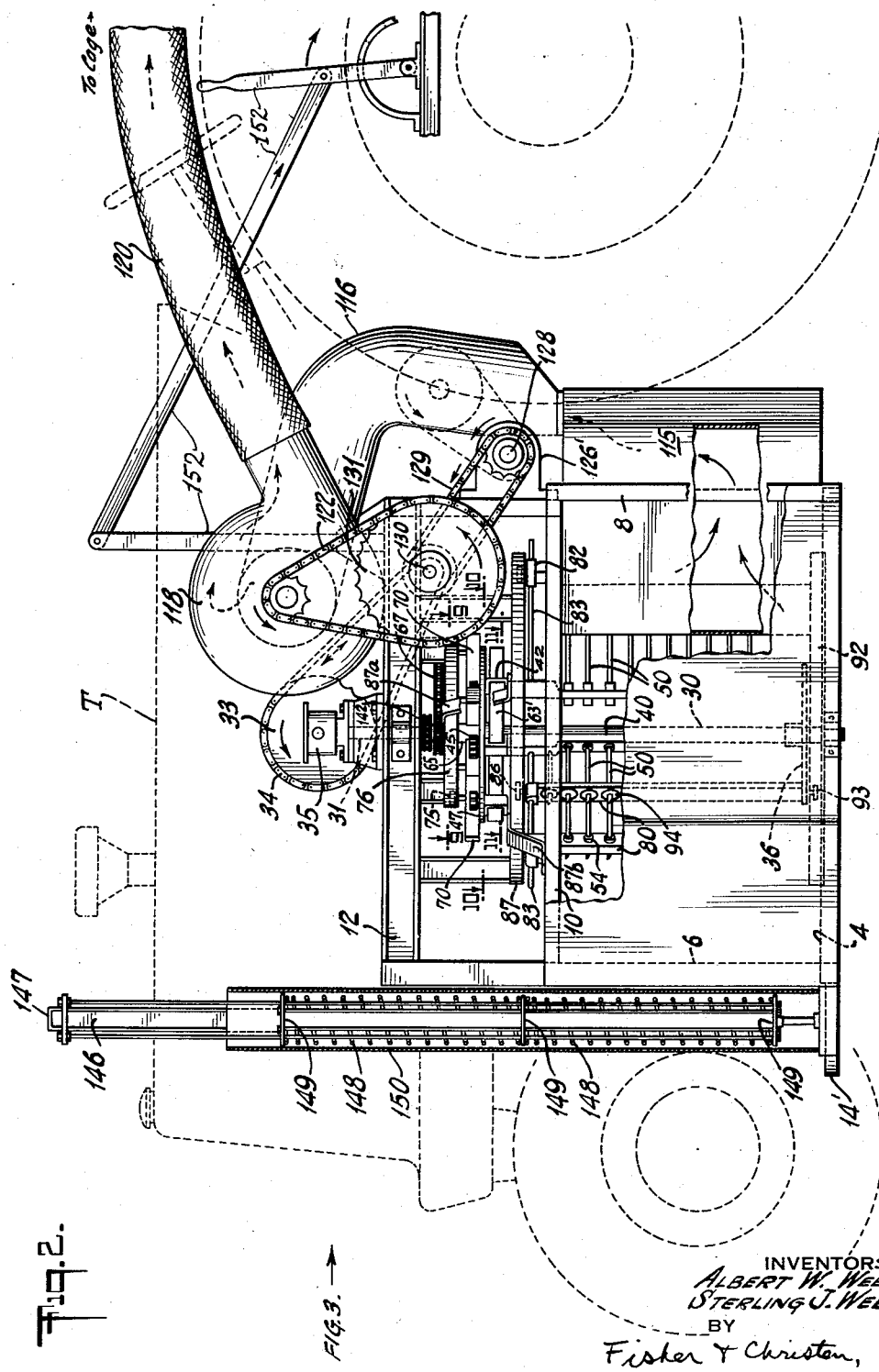

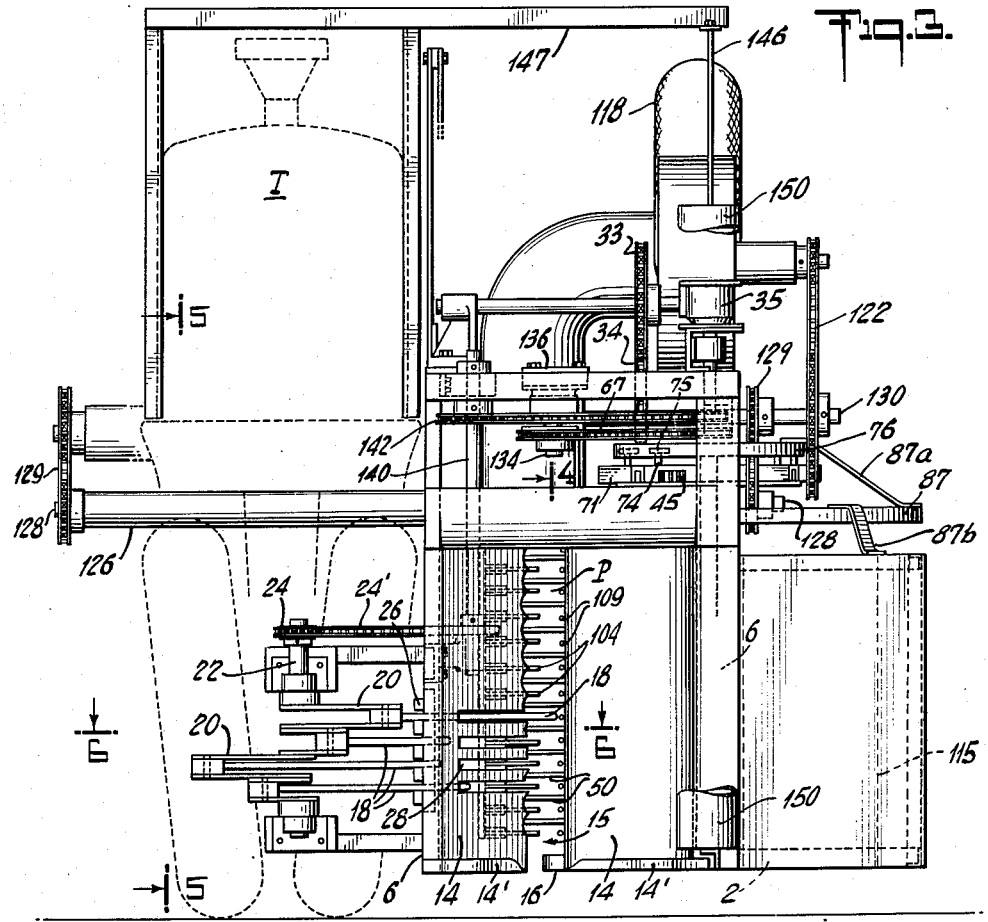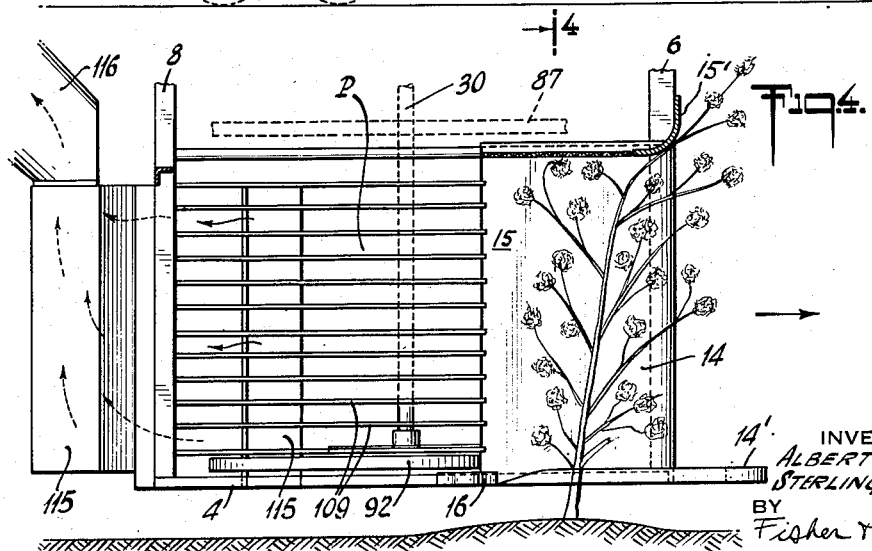

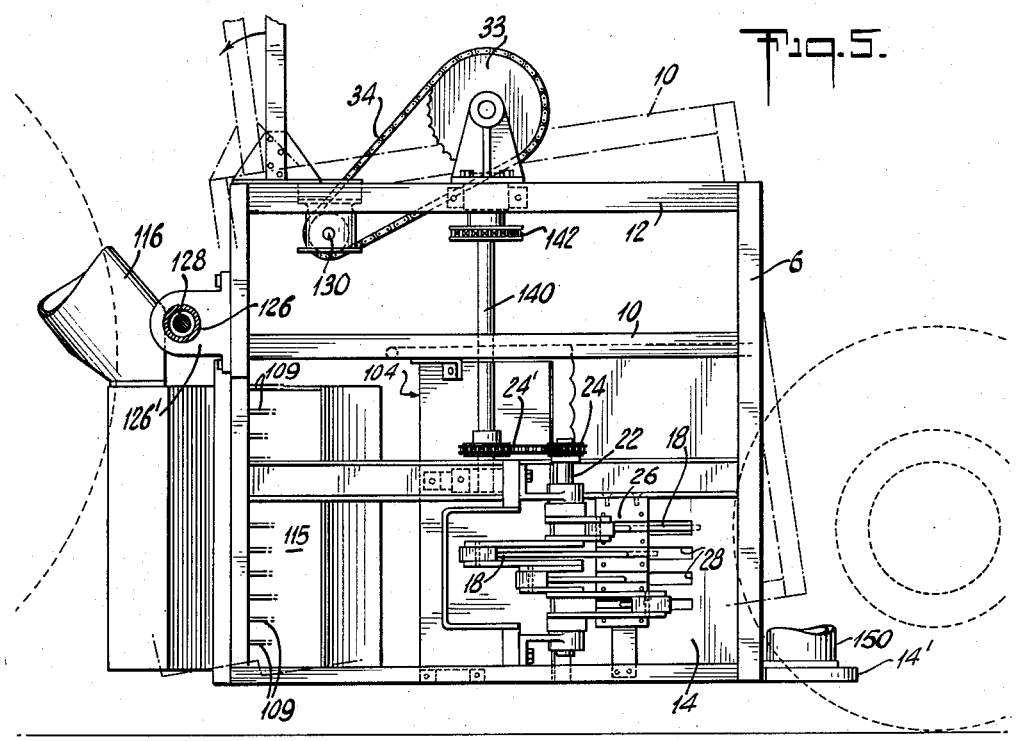
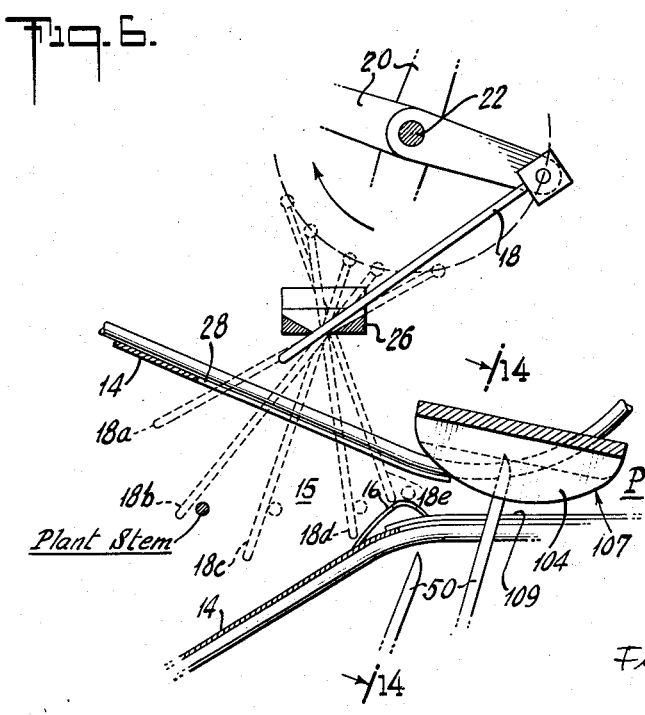

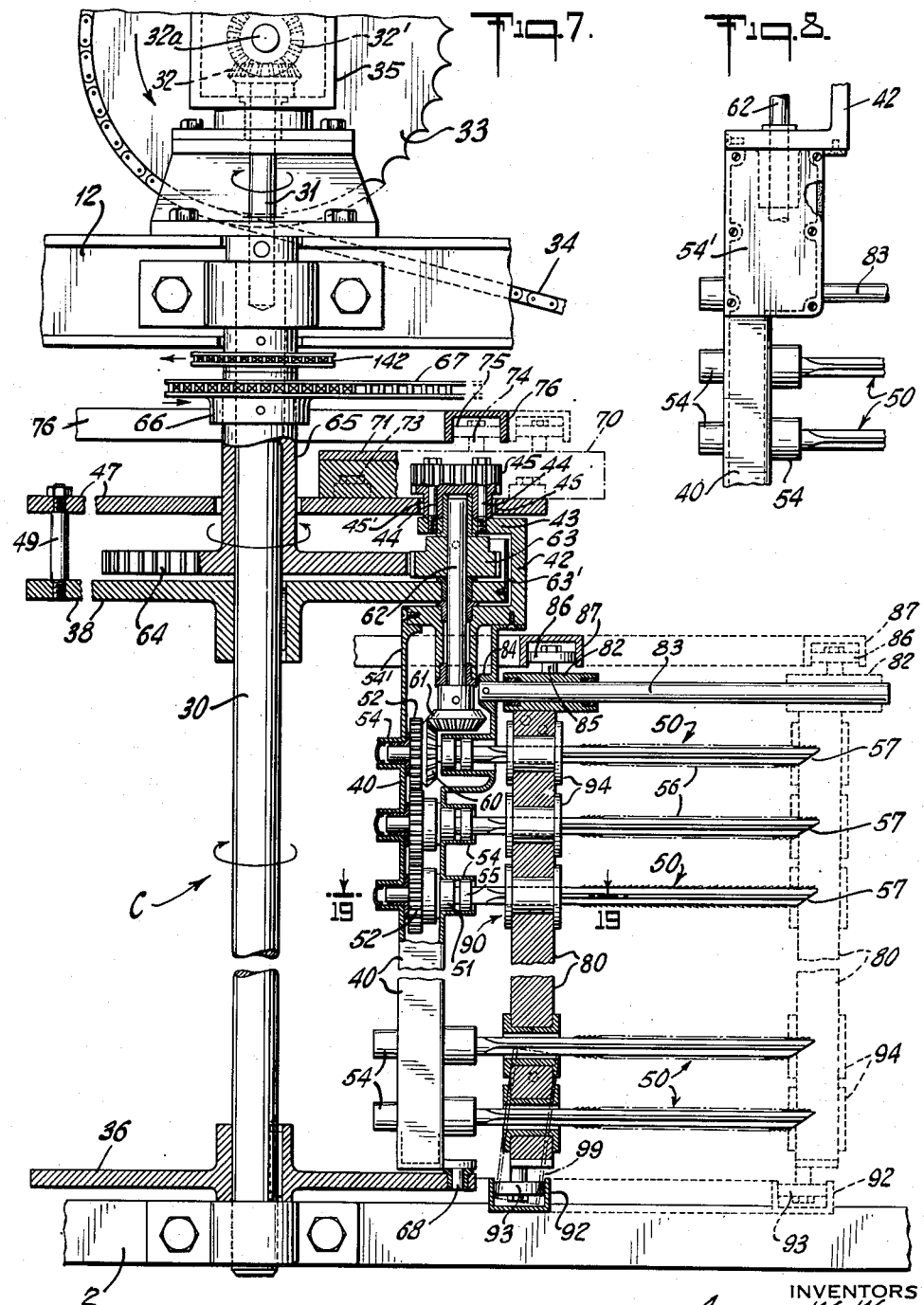

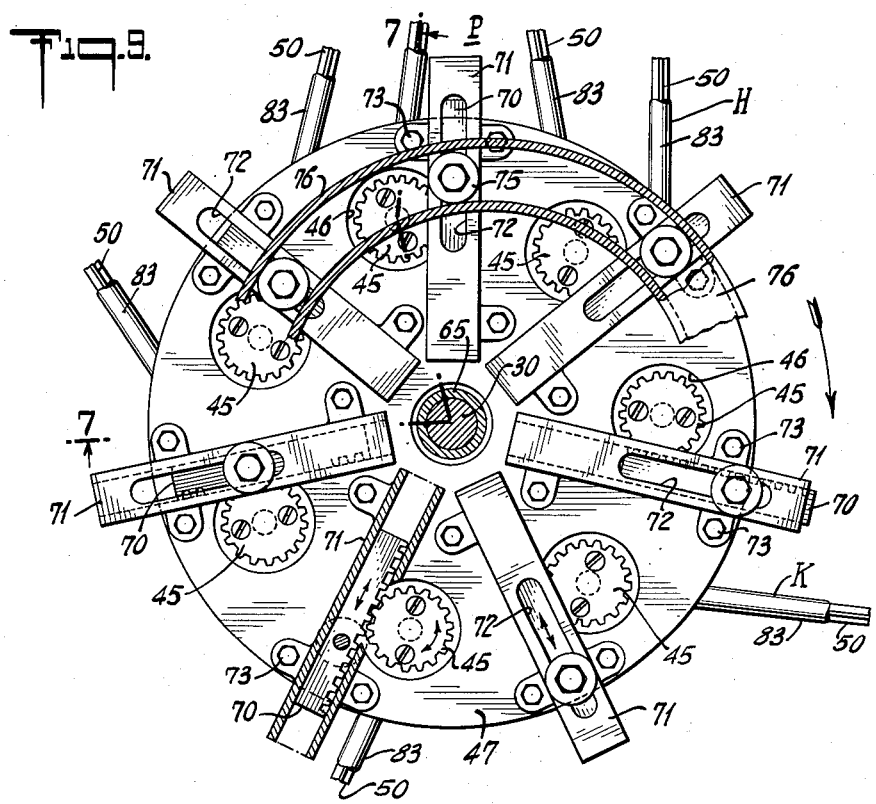
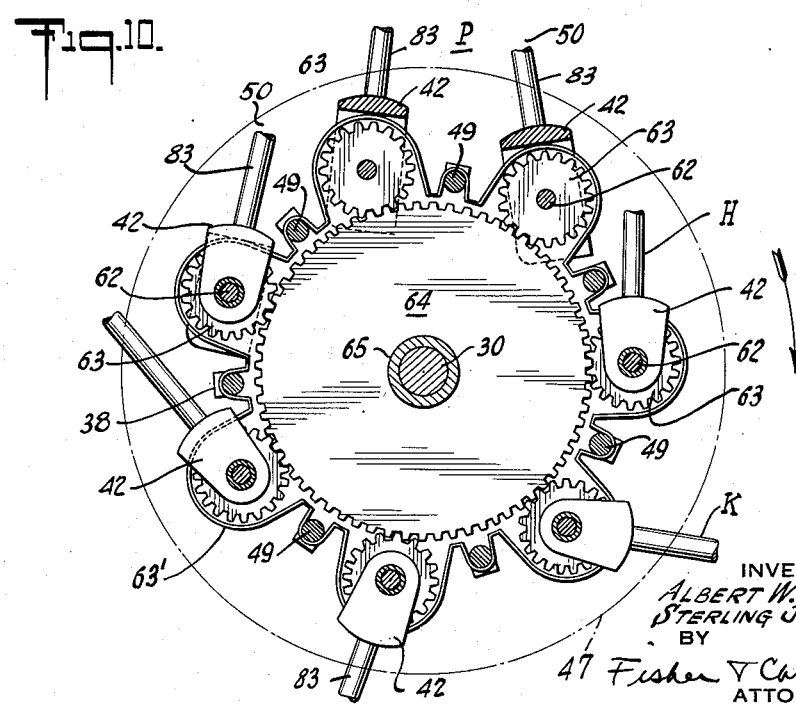

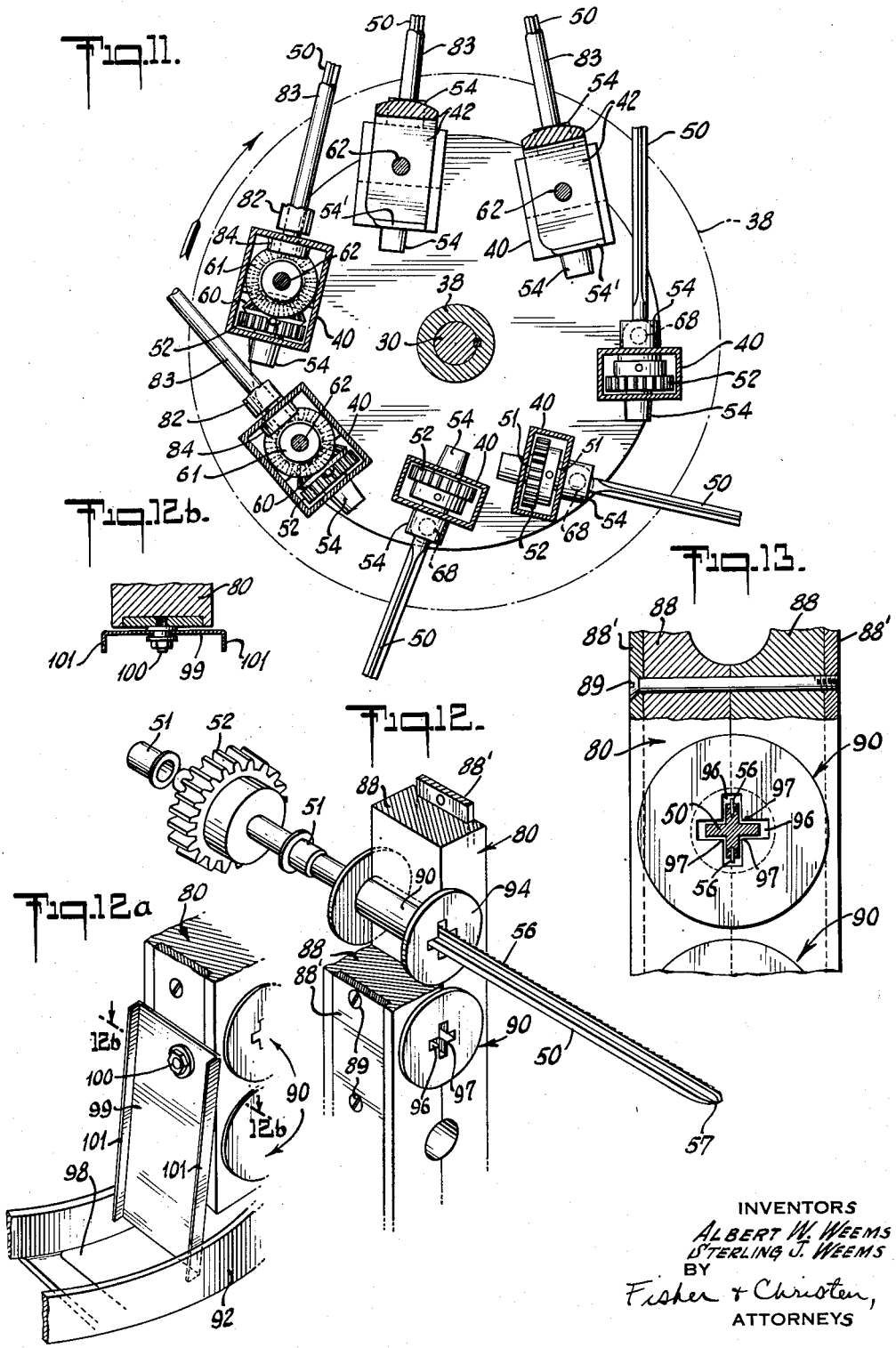

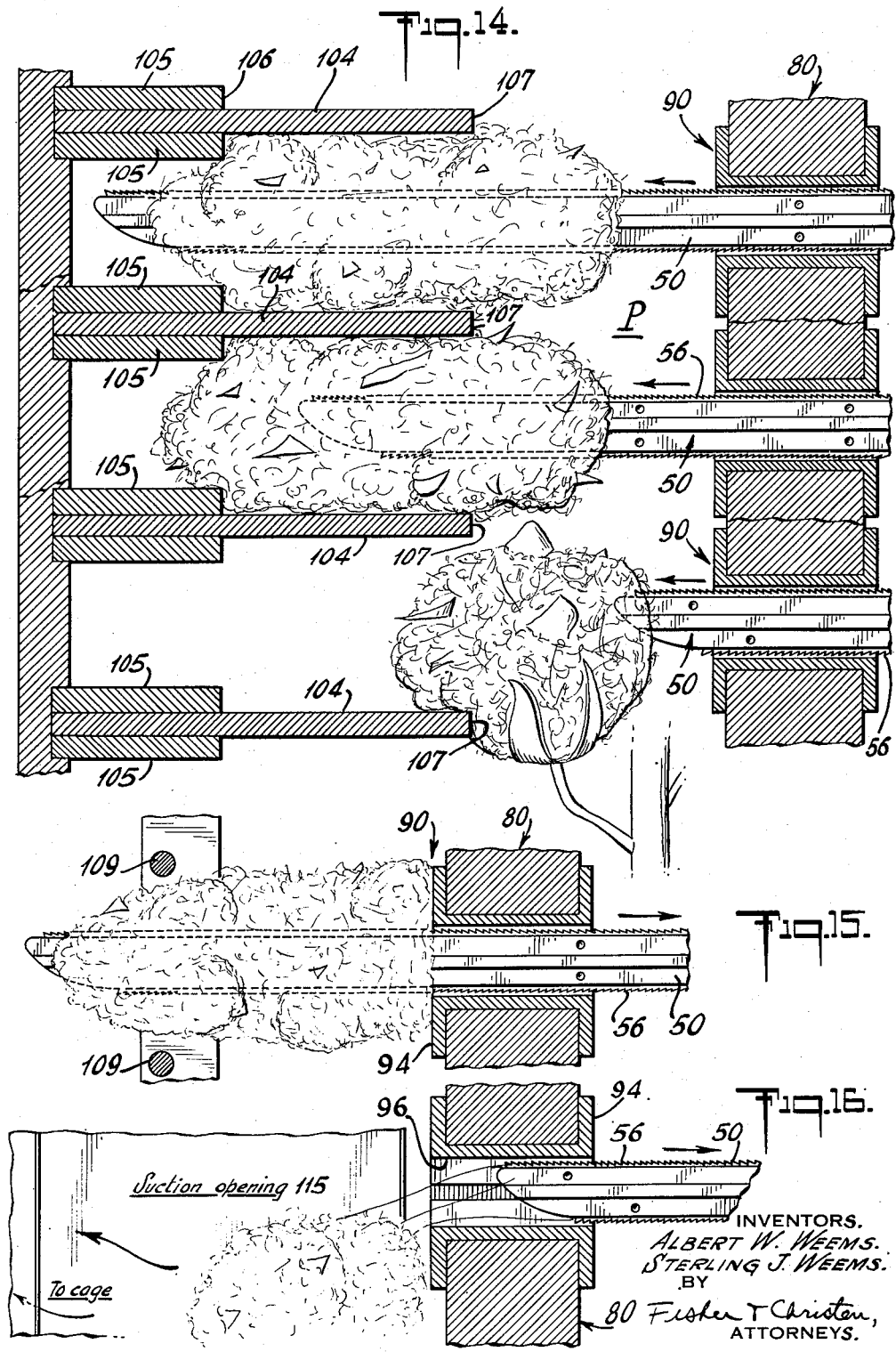

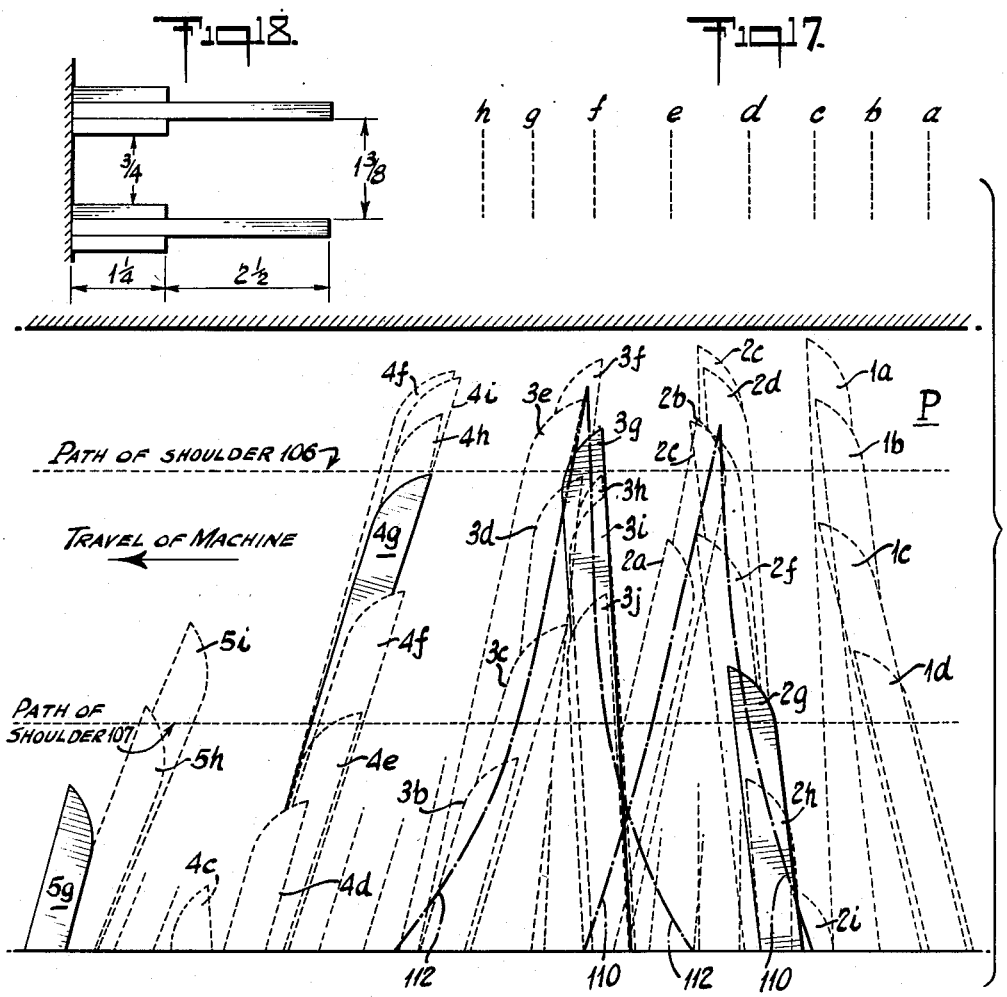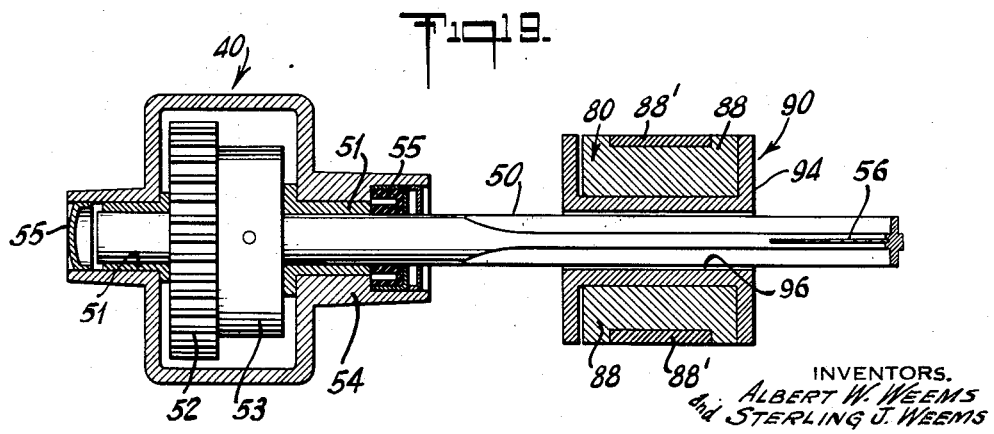

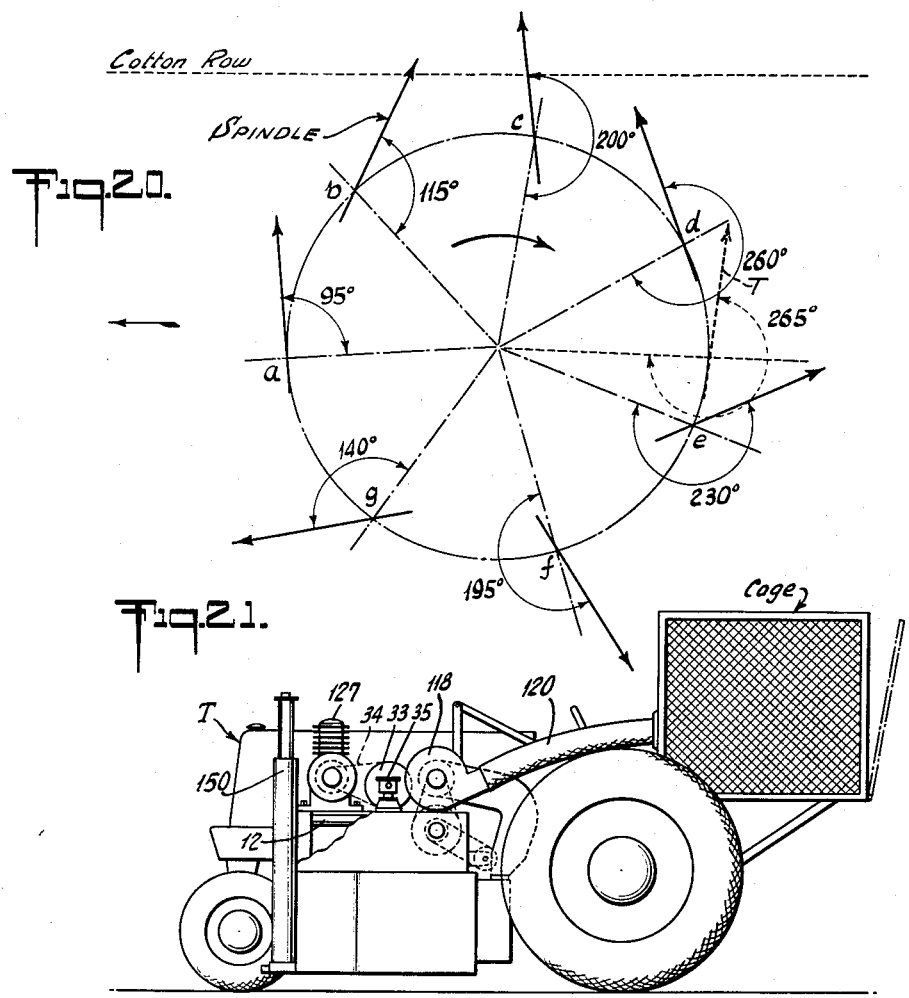
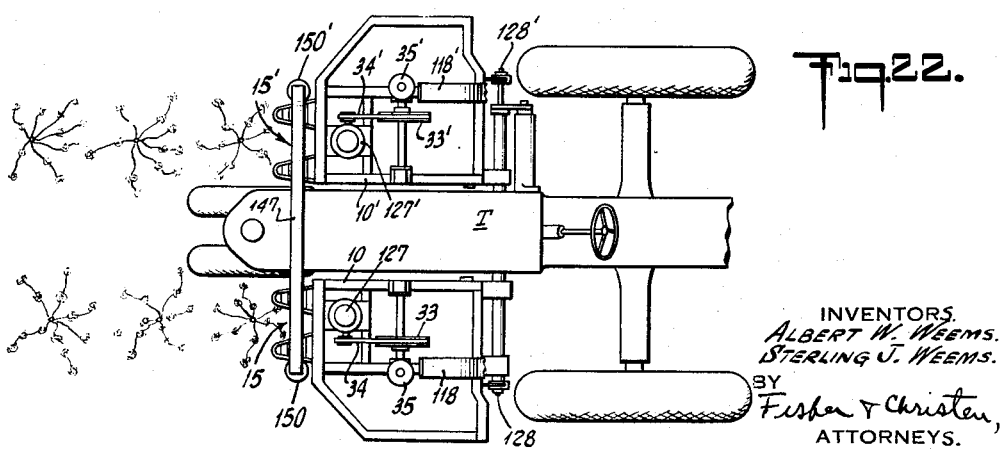

2,669,081

UNITED STATES PATENT OFFICE 2,669,081

COTTON-PICKING MACHINE

Albert W. Weems and Sterling J. Weems Meridian, Miss.

Application July 12, 1949, Serial No. 104,338

17 Claims. (Cl. 56—47)

This invention is a cotton picking machine wherein a spindle carrier frame rotates about a vertical axis, which frame carries successive vertical rows of rapidly rotating horizontally positioned spindles. As the machine moves along the row of cotton plants, successive columns of spindles are successively projected into and through the cotton plant, each spindle picking up its load of cotton, the spindles then being withdrawn from the cotton plant in such a fashion as not to create a drag on the stalks of the plant.

The principal features and objects of the invention are these:

1. To provide a cotton picking machine comprising a series of vertical columns of spindles, the several spindle columns travelling unidirectionally in a continuous circular path; at the same time that the spindle columns are travelling in such circular path, they are oscillated back and forth. In the preferred arrangement, there are seven columns of spindles, and the described oscillation is through an angle of about 170°, although the invention is not to be limited to any particular number of spindle columns or to an oscillation of 170°.

2. To provide a drive for the spindle carrier and for the spindles which will drive the carrier and spindles at any desired speed, independent of the speed of travel of the machine along the ground. In other words, the spindle carrier and spindles are not "geared to the ground" but are driven, as by a separate motor, for example, so that the speed of the spindle carrier and the spindles can be controlled by varying the speed of the motor, or by providing any convenient type of change speed gear between the motor and the spindle carrier, or both. The speed of operation of the spindles may therefore be set for most efficient operation in accordance with the density of the cotton on the plants. Furthermore, slippage of the ground wheels would not affect the speed of operation of the spindles. Under some conditions, however, the separate motor could be dispensed with.

3. As the rotating spindles go into and through the plant, each will pick up a load or charge of cotton, with the tendency for much of the cotton to be collected toward the outer end of the spindle. In order better to distribute the load of cotton along the spindle, the side of the picking chamber opposite the spindles is provided with a series of spaced parallel horizontally positioned guard plates, which define between them spaces of such a size that as the loaded spindles are moved toward and between such plates, they offer a slight resistance so that the cotton bolls are not pushed or bounced aside by the spindles, but instead are more efficiently stripped by the spindles. Furthermore, these guard plates hold the bolls in the picking chamber until the spindles come along into engagement therewith. The edges of the guard plates and shoulders within the guard plates act to push the charge of cotton back from the tips and toward the middle and base of each spindle, and aid in wrapping the cotton more tightly on the spindle. The use of these spaced guard plates has been found to increase the efficiency of the picking operation and also makes it possible to utilize a very long spindle. A long spindle is valuable, because it picks up a larger volume of cotton, and so a fewer number of spindles may be used. The distribution of the cotton along the spindles tends to expose any trash carried by the cotton and the centrifugal force of the spinning spindle acts to throw off this trash and give a cleaner pick.

4. To control the path of movement of the spindles so that as the machine travels along the row of plants, the spindles are projected into the picking chamber, into and through the plants, the spindles being pointed in a slightly backward direction as the spindles go into the plant, this angle gradually changing to a slightly forward direction as the loaded spindles leave the plant, whereby there is no drag on the plant and a minimum of defoliation and breaking of the plant twigs, thereby giving a cleaner pick of cotton. This motion covers the entire plant area in the picking chamber without a raking action which would knock off the green bolls. This change of angle from a backward angle as the spindles enter the picking chamber, to a forward angle as they leave the chamber, is important, in that the relative angle between the spindles in two adjacent columns is like the angle between the legs of the letter A, this divergence serving to spread the plant so as to expose all portions thereof to the spindles. As the spindles leave the picking chamber, strippers start to move from the base of the spindles outwardly to begin the stripping operation, these strippers acting to give a "rolling" effect to the cotton as it is pushed off the spindles and at the same time that this is taking place, the spindles are moved between horizontal wires or rods acting as a guard to keep the plants out of the stripping area and for screening and removing trash from the cotton. The spindles are then given a rapid whirl through a fairly large arc, the centrifugal effect of which is supplemented by the outward movement of the strippers to strip-off the charges of cotton collected by the spindles, the cleaned spindles continuing around uni-directionally to repeat the cycle.

5. The machine is provided with the usual restricted throat or tunnel for forming the plants and bolls into a more compact mass and guiding them into the picking chamber. In this connection, this invention provides an improved stalk feeder for engaging the approximate mid-portion of the plants, this stalk feeder comprising a plurality of horizontal rods arranged one above the other, operating successively, which are projected outwardly into engagement with the middle part of the plant and then by a novel mechanical movement to be described more in detail, pushing the middle portion of the plant into the throat of the picking chamber. Such a feeding of the plant increases the efficiency of the picking and does not break the plant in so doing.

6. Another important feature used in connection with the feeding of the plant into the converging throat just ahead of the picking chamber, is a curved guard at the lower part of this intake throat which fends the heavy bottom portions of the stalks away from the lowermost spindles, a feature which also increases the efficiency of operation.

7. The spindle carrier, as noted above, rotates on a vertical axis and carries a plurality of vertical columns of rotating spindles. The movement of these spindles is controlled by an upper cam track. One of the important features of this assembly is that above each column of spindles is a horizontal guide rod on which is slidably mounted a guide collar for a column of strippers for the corresponding column of spindles. The operation of such guide collar is controlled by another upper cam track, which will be described in more detail below.

Further structural and operational advantages of the machine will be described in connection with the accompanying drawings, wherein:

Fig. 1 is a top plan view of the cotton picker of this invention, with the outline of a tractor on which the picker is mounted shown in dotted lines;

Fig. 2 is a side elevation of Fig. 1 with parts broken away and parts in section;

Fig. 3 is a front elevation of Fig. 2, parts being broken away;

Fig. 4 is a vertical cross-section taken on the line 4—4 of Fig. 3 showing more clearly the means for partial surface removal of extraneous matter from the cotton;

Fig. 5 is a vertical cross-section taken on line 5—5 of Fig. 3, showing mechanism for feeding the cotton stalks into the picking chamber;

Fig. 6 is an enlarged plan view, partly in section taken on the line 6—6 of Fig. 3, showing diagrammatically the stalk feeding mechanism of Fig. 5;

Fig. 7 is an enlarged vertical cross-section taken on the line 7—7 of Fig. 9, showing the driving mechanism for the spindles and the stripper mechanism;

Fig. 8 is a fragmentary view of the upper portion of the spindle gear column showing a removable cover plate for access to gearing for assembly;

Fig. 9 is a horizontal cross-section taken on the line 9—9 of Fig. 2, showing in more detail the rack and pinion gears for operating the spindle column;

Fig. 10 is a horizontal cross-section taken on line 10—10 of Fig. 2, showing the driving means for the spindle gears;

Fig. 11 is a horizontal cross-section taken on the line 11—11 of Fig. 2 further amplifying the gear drive for the spindles;

Fig. 12 is a fragmentary perspective view of a spindle and associated stripper means. Fig. 12a is an enlarged perspective view, partly in section of a plate for clearing the lower cam track.

Fig. 12b is a section on line 12b—12b of Fig. 12a;

Fig. 13 is a fragmentary elevation with parts broken away and shown in section of a portion of a spindle and stripper;

Fig. 14 is a composite vertical-section taken approximately on the line 14—14 of Fig. 6, and starting at the bottom indicates three banks of spindles in progressive stages of picking;

Fig. 15 is a view similar to Fig. 14 showing the beginning of the stripping action at a stage in the cycle a little more advanced than shown in upper portion of Fig. 14;

Fig. 16 is a view similar to Fig. 15 showing the completion of the stripping action;

Fig. 17 is a diagrammatic chart of the actions of the spindles, with reference to the forward motion of the picker;

Fig. 18 is a fragmentary side elevation of two of the distributor plates, used in cooperation with the spindles;

Fig. 19 is an enlarged horizontal cross-section through the spindle column and stripper bar and taken on the line 19—19 of Fig. 7;

Fig. 20 is a diagram showing the angular positions of the spindles at various points in their circuit of travel;

Figs. 21 and 22 are diagrammatic side and plan views showing a duplicate arrangement of pickers for picking two rows of cotton at a time.

Referring now to these drawings, the cotton picking machine of this invention is shown as mounted on a tractor T, indicated in dotted lines in Fig. 1. The machine comprises a wheel supported frame including lower horizontal frame members 2 and 4, vertical frame members 6 and 8 and upper horizontal frame members 10 and 12.

*Feeding and guiding the cotton plants into the machine*

The front of the machine is provided with vertically extending sheet metal guides 14 which converge to form a throat or tunnel 15 for compacting or bunching the cotton plants to some extent and for guiding them into the picking chamber P. The front of the machine just above the ground level, is provided with heavy reenforced fenders 14', Figs. 1, 2 and 3, for guiding the stalks into tunnel 15.

The lower portion of the tunnel 15, just ahead of the picking chamber P, is provided with one or more outwardly bowed fenders or guards 16, Figs. 1 and 4, the purpose of which is to fend the heavy lower stalks away from the lowermost spindles in the picking chamber, to protect these lower spindles from the heavy stalks. This guard 16 holds the lower stalk portion of the plant away from the zone where the spindles enter the picking chamber, until a particular column of spindles, just entering the picking chamber, has entered the picking chamber and is at a proper distance from the preceding column of spindles.

Another valuable feature in connection with the feeding of the stalks into tunnel 15 is a plurality of rods 18, about four in number, which have a novel compound movement for engaging and pushing the approximate middle portions of the stalks into tunnel 15. Each rod 18, see Figs. 1, 3, 5 and 6, is pivoted to one end of a crank arm 20, the four crank arms being driven by a continuously rotating vertical shaft 22, driven by sprocket 24. Each rod 18 passes slidably through a hole in a fixed guide block 26, which block acts as a fulcrum, each rod then passing through an individual guide slot 28 in the left tunnel member 14, Fig. 3. The continuously rotating crank arms 20 are about 90° apart.

The operation of these arms 18 is as follows: As the cranks rotate clockwise, Fig. 6, rod 18 moves from its full line position to position 18a and then slides and pivots in block 26 to assume successive positions 18b, 18c, 18d and 18e. In position 18a, the rod is moving toward the cotton plants. It then moves into the plant, reaching beyond the main stem, and then as it moves to successive positions, pushes the plants along and into the tunnel 15, bending them somewhat, but not breaking them, and drawing the more fragile upper portions of the plant into the tunnel and pushing them toward and into the picking chamber P, Fig. 6. After the rod gets to 18e, it is withdrawn from the tunnel; by this time, the next rod 18 has arrived at position 18a, so that there is a steady and continuous succession of rods feeding the plants into tunnel 15 and into the picking chamber P. These rods, as noted, engage only the mid-portions of the plants and increase the efficiency of the machine by lessening breakage of the cotton plants and by guiding, bunching and moving the plants into the picking chamber.

More particularly, and referring to Fig. 4, there is a tendency of the top edge 15' of the tunnel 15 to bend the entire plant, thus lowering and concentrating the lower branches into the bottom of the picking chamber. Bending of the upper part of the plant is desirable to bring the upper branches within range of the spindles, but bending of the lower branches, which carry more bolls, is undesirable, and the rods 18 prevent too much bending of the lower portion of the stalk. This gives a more even distribution of the cotton bolls in the picking chamber.

*Picking the cotton from the plants*

As the plants come into the picking chamber P, the cotton is picked by means of successive vertical sets or columns of horizontally positioned spindles, which rotate preferably at speeds between 1500–2500 R. P. M. The columns of spindles travel in a circular path about a vertical axis; as they enter the picking chamber the spindles are inclined backwardly and as they progress through the chamber, their angle is gradually changed to a forward direction, so that the spindles enter and leave the plant with a minimum of "drag" on the plant, which means less breakage of the plant and a minimum of defoliation.

The spindle carrier assembly, designated generally at C, Fig. 7, comprises a vertical shaft 30, driven clockwise, Fig. 1, by shaft 31 keyed thereto, and gears 32 and 32', sprocket wheel 33 and chain 34. Gear 32' is on shaft 32a, and the gears 32 and 32' are enclosed in the gear housing 35.

Shaft 30 carries lower and upper main supporting or carrier plates 36 and 38. Positioned between carrier plates 36 and 38 is a plurality of spindle carrying columns 40, seven of such columns being preferable. The invention, however, is not restricted to this number of columns. Each column is supported at its upper end by a fairly heavy oscillatable control bracket 42, approximately U-shaped. The upper arm 43 of this bracket is supported by bolts 44, which in turn pass through a spur gear 45, this gear having a downwardly extending collar 45' passing loosely through opening 46 in a fixed plate 47. Plate 47 is secured to and mounted in spaced relation above plate 38 by a series of peripherally placed bolts or studs 49.

Each spindle column 40 carries a plurality of spindles 50; the base of each spindle is provided with a bearing 51, Fig. 19, and with a spur gear 52 secured thereto and held in place by collar 53. The base of each spindle is journaled in a lubricant containing housing 54, preferably formed as part of column 40, oil retaining collars 55 being provided at either end. Each spindle is cruciform in cross-section, as shown in Figs. 12 and 13, and is provided with one or more serrated members or edges 56, on opposite sides, with the teeth or points directed toward the tip of the spindle for facilitating stripping. These serrations may be provided by inserting one or two, preferably two, thin saw blades of the type commonly used for cutting metal, in slots on opposite sides of the spindle. The tip of the spindle is provided with a non-symmetrical rounded point 57.

The gears 52 of the spindles intermesh, so that adjacent spindles rotate in opposite directions, each spindle being driven by the gear of the spindle next above it. The spindles are driven from the uppermost spindle, which is provided with bevel gears 60, Fig. 7, meshing with bevel gear 61, secured to the lower end of shaft 62. Shaft 62 carries spur gears 63, which is driven by large gear 64. Gear 64 has a sleeve 65 extending upwardly, to which is secured sprocket 66, driven counterclockwise by chain 67. Gears 60, 61 and cooperating parts are enclosed in an upper enlarged portion 54' of housing 54, 54' being secured to the lower arm of bracket 42. Gears 63 are enclosed in a protective sheet metal housing 63', Fig. 10.

Each column 40 of spindles, Fig. 7, travels in a circular path, being carried by shaft 30 and plates 36 and 38 as described. The spindles are also simultaneously oscillated back and forth in a horizontal plane, about the axis of upper shaft 62 and lower coaxial stud 68, pivoted in lower plate 36. To effect this oscillation, each spur gear 45, connected through bracket 42 with each spindle column 40, meshes with and is oscillated back and forth by its respective geared rack 70, Figs. 7 and 9. Each rack is slidably mounted in an open-ended radially extending guideway 71, having a slot 72 in the top thereof; each guideway 71 is secured to plate 47 by bolts 73.

In order to reciprocate the racks 70 in their housings, each rack is provided with a stud 74 which extends upwardly through slot 72; the top of each stud 74 is provided with a roller 75 journaled thereon.

The several rollers 75 engage in an upper fixed cam track 76, Figs. 1 and 7, in the form of an inverted U. Cam track 76 is so shaped as to move studs 75 and their respective geared racks 70 radially inwardly and outwardly in the direction of slot 72, thereby oscillating gears 45, bracket 42 and the corresponding spindle column 40.

This back and forth swinging of the respective spindle columns is of the order of 170°.

Stripping mechanism

Each spindle column 40 is provided with a cooperating stripper column 80, Figs. 7 and 12. Each stripper column is supported by a cam operated slidable sleeve 82, slidable on guide rod 83, positioned above the spindles, having its inner end secured in housing 54 at 84. Each sleeve 82 is provided with a stud 85 carrying a roller 86, movable in the fixed cam track 87, which is in the form of an inverted U. Cam tracks 87 and 75 are interbraced by braces 87a; track 87 and casing 115 are interbraced by braces 87b. Each stripper column is preferably composed of two wooden strips 88, reenforced by metal strip 88', held together by bolts or screws 89.

Each stripper column 80 is provided with strippers 90, Fig. 12, generally spool-shaped, one for each spindle 50; these strippers are rotatably mounted in the column, and are slidable back and forth on the spindles, at times as controlled by the upper cam track 87 and by the correspondingly shaped lower cam track 92, the lower end of the stripper column having a roller 93 riding in the lower cam track 92.

The stripping columns, in addition to their stripping function, effective after the loaded spindles have left the picking chamber, being supported and guided by sleeves 82, their respective guide rods 83 and in cooperation with upper and lower cam tracks 87 and 92, have the important function of supporting the strippers during the picking operation and resisting the torque exerted on the strippers as they travel through the stripping zone.

The strippers 90 have end flanges 94, each having cruciform slots to engage over the cruciform spindles. The shape and size of the slots are important. Such slots have end clearance spaces 96, Fig. 13, beyond the outer edges of the ribs of the spindle, particularly beyond the teeth 56 thereof. The inwardly projecting edges 97 of the slots extend well within the corners of the spindle, and lie close to the radially extending sides of the ribs of the spindle. These details are important, because there is a tendency for the cotton fibers to jam in between the strippers and the teeth of the ribs of the spindle, and if that happens, the stripper becomes locked on the spindle so that breakage of some part, or stoppage of the machine, will result. However, with the construction described, this is avoided, because the cotton fibers, as they wrap around the spindle, form a square, bridging over diagonally from the outer edge of one rib to the outer edge of the next rib. Now the inwardly projecting corners 97 engage below the perimeter of the square formed by such diagonal fibers and push them out along the spindle, any fibers at the outer edges of the ribs sliding outwardly along the ribs, with no jamming of the fibers, because of clearance spaces 96, the outwardly directed teeth 56 on the spindles readily allowing such stripping.

Certain features of the stripping mechanism just described are disclosed and claimed in the Patent to Albert W. Weems, 2,645,892, dated July 21, 1953.

Another important feature is this: Cotton fibers tend to collect in the lower cam track 92 and unless removed, will jam rollers 93 and stop the machine. In order to keep the track clear, it is provided with discharge openings 98, Fig. 12a. The lower and front end of each stripper column carries a small plate 99, loosely mounted on pin 100, having bordering flanges 101. The lower end of this plate rides in the cam track and due to lateral movement allowed by pivot 100, it will follow the curvature of the track. This scraper or pusher plate keeps the track clear of cotton fibers, which drop out through the discharge spaces 98.

Distributor and resistance plates in the picking chamber

As the rotating spindles go into the cotton plants, there is a tendency for the cotton to bunch up near the outer end of the spindle, which bunching tends to prevent the rest of the spindle from picking up a normal charge of cotton. In order to overcome this, there is provided a plurality of horizontally positioned distributor plates 104 shown more particularly in Figs. 1, 14 and 18. These distributor plates 104 are positioned in the picking chamber on the side opposite the side where the spindles enter the chamber. Supporting blocks 105 cooperate with the plates 104 and provide inner shoulders 106, while the outer edges of the plates which are curved as shown in Fig. 1, provide shoulders 107.

All of the spindles, in a particular column of spindles enter the picking chamber P at the same time. As illustrated in Fig. 14, the lowermost spindle represents the position of all the spindles in that spindle column as they enter the picking chamber. The middle spindle represents the position of all the spindles in that column after they have moved farther across the picking chamber, and so on, for the upper spindle.

Referring to Fig. 14, guard plates 104 tend to hold the bolls in the picking chamber and offer a slight resistance to movement of the bolls, holding them in position to be engaged by the entering spindles. The column of spindles represented by the lowermost spindle is shown as entering the picking chamber P, the boll being lightly held by the outer shoulder 107. The next position of the column is illustrated by the middle spindle, those spindles having picked up considerable cotton. The inner shoulders 106 serve to push the cotton back from the spindle tips, which tend to become overloaded, and so give a better distribution of cotton along the spindle. The resistance offered by shoulders 106 and the restricted space between the plates 104 aid in wrapping the cotton more tightly around the spindle, so that each spindle picks up a good amount of cotton. The above considerations enable the use of quite a long spindle, whereby a fewer number of spindles may be used, and the cotton picked cleanly with a minimum of trash.

Furthermore, as a load of cotton is distributed well along the spindles, more of the cotton is exposed so that as the spindles leave the plates 104 trash that may be carried is exposed. Some of this trash will be thrown off by the spinning spindle, which as already noted, rotates at about 1500 to 2500 R. P. M. After the loaded spindles pass from between plates 104 and as they leave the picking chamber, they pass beneath horizontal rods 109 in alinement with plates 104, forming a grating, which grating aids in scraping off trash carried by the cotton on the loaded spindle and prevents the plant from entering the next or stripping zone. The dimensions of the guard plates 104 and corresponding parts are shown in Fig. 18. Such dimensions have been found to be efficient and satisfactory although the invention is not to be limited to these precise numerical values.

Movement of the spindles

In the particular machine here illustrated there are conveniently seven columns of spindles with twelve spindles in a column, although, of course, the invention is not limited to these precise values. These spindles have a combined movement, which is the resultant of their rotating continuously about the vertical axis 30 and of being simultaneously swung back and forth by the geared racks 70 through an angle of about 170°. Successive positions of the spindles at various points in their travel are shown in Figs. 9, 10, 17 and 20.

Referring to Figs. 9 and 10, the picking chamber P may be considered at the top of the figure while in Fig. 17 the picking chamber extends to the dotted line representing the position of the inner shoulders 107 of the distributor plates.

Referring to Fig. 17, the spindle at the right in position 1a is at its point of maximum outward travel in the picking chamber and as it leaves the picking chamber it assumes successive positions 1b, 1c, and 1d.

The next spindle is advancing into the picking chamber and its successive positions are indicated at 2a, 2b, 2c, 2d, 2e, 2f, 2g, 2h, and 2i. The center line of travel of the tip of this spindle is shown by the broken line 110.

The next spindle is shown entering the picking chamber at 3b and its successive positions are shown at 3c, 3d, 3e, 3f, 3g, 3h, 3i and 3j, the center line of the spindle tip being indicated by broken line 112.

The next spindle is shown entering the picking chamber at 4c, its successive positions being indicated at 4d, 4e, 4f, 4g, 4h, 4i and 4j.

The next spindle is shown entering the chamber at 5g, its successive positions being indicated at 5h and 5i.

Corresponding small letters in the above description represent corresponding positions of the indicated spindles at a given time. That is to say, 1d, 2d, 3d, and 4d represent the positions of the corresponding spindles at a given instant. Also, 2g, 3g, 4g and 5g represent the corresponding positions of the spindles at a given instant.

Referring to Fig. 17, it will be noted that as a particular spindle enters the picking chamber, the machine traveling in the direction of the arrow, the spindle is pointed slightly backwardly and then as the machine moves along, the spindle is projected more and more into and through the plants. The angles of the spindles gradually change, as already described, so that as a spindle leaves the picking chamber it is pointed slightly forwardly, as shown at the right of Fig. 17. To illustrate this feature in more detail, consider spindle positions 3e and 2e, Fig. 17. The spindles in these two columns diverge, somewhat like the legs of the letter A, and this divergence serves to spread the cotton stalks and so enables the spindles to reach all the bolls.

The close proximity of the spindles as they move in succession into and through the picking chamber enables the spindles to reach all portions of the plants; this is followed by the spreading action of the spindles on the plants due to the divergent positions between adjacent columns of spindles just as the spindles are leaving the picking chamber, as just described; this still further aids the spindles in reaching all portions of the plant. With the described method of operation, the spindles work efficiently, cover all portions of the plants, and enter and leave the plants with a minimum of "drag" on them, and with a minimum of breakage and defoliation.

In Fig. 20, the various angular values there shown, such as 95°, 115°, 200°, etc., in each case represent the angle between the spindle column at that position, and its radial axis.

In Fig. 20, the spindle, as it moves from position "d," goes to position "T," marked 265°, this position "T" representing the 170° maximum swing from position "a" at 95° to position "T" at 265°, the difference between these angular positions 265° and 95° being 170°.

The stripping operation

After the loaded spindles leave the picking chamber and have passed between the grating formed by the rods 109, they are swung rapidly clockwise, Figs. 9, 10 and 11, from about the position H to position K, as controlled by upper cam track 76. This particular swing, as well as the other horizontal movements of the spindles, is caused by the curvature of cam track 87 in cooperation with the swing imparted by the spur gears 45. The centrifugal force of the rapid swing at this stage cooperates with the strippers 90 to effectively strip the cotton from the spindles as shown at Fig. 16, the cotton dropping into the box 115; this box is subject to suction, the cotton passing upwardly in suction pipe 116 into the suction side of blower 118 and thence out pipe 120 into the usual collecting cage.

Driving mechanism for the various parts

Blower 118 is driven by sprocket chain 122.

The machine of this invention may be mounted on a tractor, in any convenient manner, as by one or more lateral supports 126. Power for actuating the machine may be provided by a countershaft 128 driven by a power takeoff from the tractor, preferably through a change speed gear, so that any desired speed may be had, independent of the speed of the tractor. Instead, however, of driving shaft 128 from the tractor, it is preferred to mount a small one or two cylinder gasoline engine 127 at any convenient place and have such engine drive the shaft 128 or its equivalent. Such engine can be operated at a desired speed and connected to the drive shaft by any desired change speed connection, so that the picker can be operated at the most efficient speed, independently of the ground speed of the machine.

Shaft 128 drives sprocket chain 129, which drives shaft 130, which in turn drives sprocket 131 for blower chain 122. Shaft 130 also carries a sprocket which drives sprocket chain 34 and sprocket 33 and gears 32' and 32 and shafts 31 and 30, already described, to drive the spindle column Fig. 7, clockwise.

Gear plate 64, Fig. 7, is driven counterclockwise by chain 67, as already described. This chain 67 is driven by a sprocket on vertical countershaft 134, Fig. 3, which in turn is driven by conventional bevel gears in gear housing 136, such bevel gears being driven by countershaft 130, Fig. 1.

The stalk feeder arms 18, 18 are driven by sprocket 24, as described. Sprocket 24 is driven by a sprocket chain 24' on the lower end of vertical shaft 140, Fig. 3, shaft 140 being driven by sprocket chain 142, Figs. 3, 5 and 7, the sprocket for which is secured to and driven by collar 66, which is driven by 67, as described.

The front end of the machine may be supported by the support 146, carried by one end of the horizontal beam 147 extending out from tractor T. Support 146 may be connected to the front end of the picker through a conventional resilient mounting including springs 148 confined between plates 149, enclosed in housing 150. This resilient connection provides a counterbalance against the weight of the picker, thereby enabling the picker to be raised or lowered easily by means of a lever system 152, Fig. 2, adjacent the driver's seat, acting through fulcrum brackets 126', Fig. 5. This raising or lowering is useful for setting the machine at a desired level and for traveling to and from the fields.

*Duplication of the machines*

A single cotton picking machine has been described as carried by a tractor, and preferably driven by a separate gasoline engine, so that the speed of operation of the cotton picker is independent of the speed of operation of the tractor; even if driven by the tractor, a conventional change speed mechanism could be used cooperating with the power take-off from the tractor. Moreover, if desired, the tractor could be arranged to carry a second cotton picking machine on the opposite side. Two rows of plants could thereby be picked at one time, or one row could be gone over a second time, by one machine, while the other machine is picking a new row. Where two such machines are used the spindle columns of the picker on the other side would rotate in the opposite direction, and the terms "clockwise" and "counterclockwise" would be interchanged, particularly in connection with figures like 7, 11 and 20. Referring to Figs. 21 and 22, showing the two machines, the duplicate parts of the second machine are indicated by corresponding primed reference characters. This second picker could have its own gasoline engine 200, Figs. 21 and 22, for driving it, or could be driven by the same engine used for driving the first picker or could be driven by power take-off means from the tractor, with or without change speed gears, in all of which arrangements the speed of the picker could be varied with respect to the speed of the tractor, so that the picker could be operated at a speed most efficient for the existing conditions, and is not dependent on the speed of travel of the tractor.

*Résumé of operation*

In operation, as the machine moves along one or more rows of cotton plants, the plants are guided into the tunnel or throat 15 and are engaged by continuously operating arms 19 to push them into the tunnel, the lowermost portion of the stalks being fended away from the lowermost spindles by the guard 16. When the plants are in the picking chamber P, they are engaged by the continuously rotating and reciprocating spindles which extract the cotton from the bolls. The loaded spindles then move into the spaces between the guide plates 104 on the opposite side of the picking chamber, these guide plates serving to distribute the load of cotton lengthwise of the spindles, Fig. 14. As the spindles enter the picking chamber they are inclined somewhat backwardly as shown in Fig. 17, and as they progress into, through and out of the picking chamber the angle is gradually changed so that as they leave the picking chamber, they are inclined somewhat forwardly. Spindles in two adjacent columns, as they leave the picking chamber, have divergent positions, like the letter A, to thereby spread apart the stalks and open them up for more complete access thereto by the spindles. The spindles, therefore, enter and leave the plants with little or no drag on the plants thereby minimizing the breaking-up and defoliation of the plants and giving a cleaner pick. As the spindles leave the picking chamber, they pass between the grating rods 109; they are then swung rapidly by the upper cam track 76 in a clockwise direction, Fig. 11, from about the position H to position K. At this stage, the stripper column 86, as controlled by the upper and lower cam tracks 87 and 92, moves the strippers to the dotted line position of Fig. 7, to strip off the charge of cotton from the respective spindles, this operation being aided by the centrifugal force of the swing. The cotton drops into the collection box 115, from which it is carried away by suction to a collection cage. The spindles continue their clockwise rotation, the strippers being moved back to the bases of the spindles which continue on around and reciprocate into and out of the picking chamber P to repeat the cycle. By reason of the stripper plate construction 94, as shown in Fig. 13, the cotton is stripped cleanly from the spindle without any tendency to jam the stripper.

The machine of this invention operates satisfactorily, without the use of water for moistening or washing the spindles, as has been proposed in the prior art.

It is important that the cotton picking machine be driven at the speed most efficient for existing conditions, and this is accomplished, as has been described, by providing a separate gas engine for driving the cotton picker, or by providing a conventional change speed gear cooperating with power take-off from the tractor. However, a change speed drive or a separate gasoline engine drive need not be used and under certain conditions, these may be dispensed with and the picking machine driven directly from the tractor.

While the invention has been described in considerable detail, together with mention of particular dimensional and numerical angular values, it should be understood that these details are illustrative and not restrictive of the invention, and that the invention may be carried out in other ways than by the precise details herein shown and described.

We claim as our invention:

1. A cotton picking machine, comprising a picking chamber, a rotatable vertical shaft, upper and lower supporting plates carried by said vertical shaft, a plurality of vertically positioned spindle columns pivotally mounted on vertical axes between said plates, rotatably mounted spindles carried by said spindle columns, gears carried by the spindle column for rotating said spindles, means for rotating said shaft and the plates and spindle columns carried thereby through a 360° unidirectional path, gears mounted above said upper plate and connected with said spindle columns for oscillating said spindle columns back and forth about their respective vertical axes, and a fixed cam track carried by the machine and operatively connected with said gears that oscillate the spindle columns, for effecting said oscillatory movement of the spindle columns, said cam track causing the spindles in each column of spindles to enter the picking chamber at a backward inclination with respect to the travel of the machine and to change this angle gradually to a forward inclination whereby adjacent columns of spindles exert a spreading action on the cotton plants as they progress through the picking chamber.

2. The combination as set forth in claim 1, further including horizontally extending, vertically spaced distributer means mounted on the side of the picking chamber opposite the spindles, for receiving loaded spindles between them and for pushing cotton collected on the spindles toward the bases thereof.

3. The combination as claimed in claim 1, further including a stripper column supported by said upper plate, strippers journaled in said stripper column and slidably mounted in said spindles, a second fixed cam track carried by the machine, and means operatively connecting said second cam track and said stripper column for causing the strippers to move back and forth on the spindles at controlled intervals.

4. The combination as set forth in claim 3, further including horizontally extending, vertically spaced distributer means mounted on the side of the picking chamber opposite the spindles, for receiving loaded spindles between them and for pushing cotton collected on the spindles toward the bases thereof.

5. A cotton picking machine, comprising a picking chamber, a rotatable vertical shaft, upper and lower supporting plates carried by said shaft, a plurality of vertically positioned spindle columns pivotally mounted on vertical axes between said plates, and spaced around said shaft at regular intervals, rotatably mounted spindles carried by said spindle columns, gears carried by the spindle column for rotating said spindles, means for rotating said shaft and said plates and the spindle columns carried thereby in a 360° unidirectional path, geared means supported above said upper plate and operatively connected to each of said spindle columns for oscillating said spindle columns and the spindles carried thereby back and forth about their respective vertical axes, a fixed cam track carried by the machine, and cam means operatively connecting said cam track and said geared means for effecting said back and forth movement of said spindle columns.

6. The combination as set forth in claim 5, further including a third plate supported by and above said upper plate and movable therewith, said third plate serving to support said geared means for oscillating the spindle columns, a fixed cam track carried by the machine, and cam means operatively connecting said geared means and said fixed cam track for effecting said oscillatory movement of the spindle columns about their respective vertical axes.

7. A cotton picking machine, comprising a rotatable vertical shaft, upper and lower supporting plates fixed to said shaft, a plurality of vertically positioned spindle columns pivotally mounted on vertical axes between said plates, and spaced around said shaft at regular intervals, rotatably mounted spindles carried by said spindle column, gears carried by the spindle column for rotating said spindles, means for rotating said shaft and said plates and spindle columns carried thereby in a 360° circular path, a gear wheel operatively connected with each spindle column, a geared rack operatively connected with each gear wheel, said gear wheels and racks being supported by and movable with said upper plate, a fixed cam track carried by the machine, and cams, operatively connected with said cam track and with said geared racks, respectively, for reciprocating said racks for oscillating said gear wheels and the spindle columns connected thereto back and forth about their vertical axes.

8. A cotton picking machine, comprising a rotatable vertical shaft, upper and lower supporting plates fixed to said shaft, seven vertically positioned spindle columns pivotally mounted on vertical axes between said plates, and spaced around said shaft at regular intervals, rotatably mounted spindles carried by said spindle column, gears carried by the spindle column for rotating said spindles, means for rotating said shaft and said plates and spindle columns carried thereby in a 360° circular path, seven gear wheels connected respectively with the spindle columns, a geared rack operatively connected with each gear wheel, said gear wheels and racks being supported by and movable with said upper plate, a fixed cam track carried by the machine, and cams, operatively connected with said cam track and with said geared racks, respectively, for reciprocating said racks for oscillating said gear wheels and the spindle columns connected thereto back and forth about their vertical axes through an angle of about 170°.

9. A cotton picking machine, comprising a rotatable vertical shaft, upper and lower supporting plates fixed to said shaft, a plurality of vertically positioned spindle columns pivotally mounted on vertical axes between said plates, and spaced around said shaft at regular intervals, rotatably mounted spindles carried by said spindle column, gears carried by the spindle column for rotating said spindles, means for rotating said shaft and said plates and spindle columns carried thereby in a 360° circular path, a gear wheel operatively connected with each spindle column, a geared rack operatively connected with each gear wheel, said gear wheels and racks being supported by and movable with said upper plate, a fixed cam track carried by the machine, cams, operatively connected with said cam track and with said geared racks, respectively, for reciprocating said racks for oscillating said gear wheels and the spindle columns connected thereto back and forth about their vertical axes, a stripper column for each column of spindles, strippers journaled in said stripper column and longitudinally slidable on the spindles, a second fixed cam track carried by the machine, and cams, cooperating with said second fixed cam track and with said stripper column, for moving the stripper column and the strippers carried thereby, back and forth on said spindles.

10. A cotton picking machine, comprising a rotatable vertical shaft, upper and lower supporting plates fixed to said shaft, a plurality of vertically positioned spindle columns pivotally mounted on vertical axes between said plates, and spaced around said shaft at regular intervals, rotatably mounted spindles carried by said spindle column, gears carried by the spindle column for rotating said spindles, means for rotating said shaft and said plates and spindle columns carried thereby in a 360° circular path, a stripper column for each column of spindles, strippers journaled in the stripper columns and respectively slidable on the spindles in the corresponding spindle columns, a horizontal guide rod carried by each spindle column near the upper end thereof, a sleeve slidable on each of said guide rods, each sleeve being secured to the upper end of its corresponding stripper column, a fixed cam track carried by the machine, and cams operatively connected to the cam track and the respective slidable sleeves, for moving the stripper columns and the strippers carried thereby, back and forth on the spindles.

11. The combination as claimed in claim 10, further including a second fixed cam track carried by the machine frame and positioned below the lower ends of the stripper columns, and cams operatively connecting the lower ends of the stripper columns with said second fixed cam track.

12. A cotton picking machine, comprising a rotatable vertical shaft, upper and lower supporting plates fixed to said shaft, a plurality of vertically positioned spindle columns pivotally mounted on vertical axes between said plates, and spaced around said shaft at regular intervals, rotatably mounted spindles carried by said spindle column, gears carried by the spindle column for rotating said spindles, means for rotating said shaft and said plates and spindle columns carried thereby in a 360° circular path, a third plate spaced above and fixed to said upper plate, a circular gear positioned between said upper plate and said third plate and journaled on said vertical shaft, means for rotating said circular gear, geared means operatively connecting said circular gear and said gears for rotating said spindles, a series of circular gears positioned on said third plate and operatively connected, respectively, with said spindle columns, a corresponding series of geared racks carried by said third plate and meshing respectively with said series of circular gears, a fixed cam track carried by the machine, and cam means operatively connecting said geared racks and said fixed cam track, said series of circular gears and co-operating geared racks serving to oscillate the spindle back and forth about vertical axes.

13. The combination as claimed in claim 12, further including a stripper column for each column of spindles, strippers carried by said stripper column, adapted to slide back and forth on said spindles, means for mounting said stripper columns to move back and forth along the spindles, a second fixed cam track, and cam means operatively connecting said fixed cam track and stripper columns for effecting said back and forth movement of said stripper columns.

14. A cotton picking machine, comprising a rotatable vertical shaft, upper and lower supporting plates fixed to said shaft, a plurality of vertically positioned spindle columns pivotally mounted on vertical axes between said plates, and spaced around said shaft at regular intervals, rotatably mounted spindles carried by said spindle column, gears carried by the spindle column for rotating said spindles, means for rotating said shaft and said plates and spindle columns carried thereby in a 360° circular path, means forming a picking chamber through which said spindles pass during part of their rotary travel, a vertical series of horizontally extending, vertically spaced resistance and distributor members positioned on the side of said picking chamber opposite the spindles, said resistance and distributor members being positioned to receive between them the outer portions of loaded spindles and acting to push the cotton picked up by the outer portions of the spindles along the spindles toward the bases thereof so as to distribute the cotton more uniformly thereon.

15. The combination as claimed in claim 14, further including stop shoulders positioned within and toward the bases of said resistance and distributor members, for further pushing the cotton back from the tips of the spindles.

16. The combination as claimed in claim 14, further including a stripper column for each column of spindles, strippers carried by said stripper column, back and forth on said spindles, means for mounting said stripper columns to move back and forth along the spindles, a second fixed cam track, and cam means operatively connecting said fixed cam track and stripper columns for effecting said back and forth movement of said stripper columns.

17. The combination as claimed in claim 16, further including stop shoulders positioned within and toward the bases of said resistance and distributor members, for further pushing the cotton back from the tips of the spindles.

ALBERT W. WEEMS.
STERLING J. WEEMS.

References Cited in the file of this patent

UNITED STATES PATENTS

| Number | Name | Date |
|---|---|---|
| 555,118 | Pickering | Feb. 25, 1896 |
| 1,818,537 | Cullander | Aug. 11, 1931 |
| 1,888,505 | Johnston | Nov. 22, 1932 |
| 2,004,713 | Thomann | June 11, 1935 |
| 2,025,514 | Johnston | Dec. 24, 1935 |
| 2,073,653 | Rust et al. | Mar. 16, 1937 |
| 2,508,842 | Searles | May 23, 1950 |